United States Patent
Lee et al.

(10) Patent No.: US 8,034,501 B2
(45) Date of Patent: Oct. 11, 2011

(54) PASSIVE COOLING SYSTEM FOR FUEL CELL STACK

(75) Inventors: Seung-jae Lee, Yongin-si (KR);
Do-young Seung, Yongin-si (KR);
Tae-won Song, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1202 days.

(21) Appl. No.: 11/740,492

(22) Filed: Apr. 26, 2007

(65) Prior Publication Data
US 2008/0050628 A1    Feb. 28, 2008

(30) Foreign Application Priority Data

Aug. 28, 2006 (KR) .......................... 10-2006-081841

(51) Int. Cl.
*H01M 8/04* (2006.01)
(52) U.S. Cl. ........................ 429/437; 429/439
(58) Field of Classification Search .................... 429/12, 429/13, 34, 36, 38, 437, 439, 452
See application file for complete search history.

(56) References Cited

U.S. PATENT DOCUMENTS

| | | | |
|---|---|---|---|
| 4,923,767 A * | 5/1990 | Grasso et al. | 429/437 |
| 5,302,470 A * | 4/1994 | Okada et al. | 429/410 |
| 6,312,842 B1 * | 11/2001 | Reiser et al. | 429/437 |
| 7,052,790 B2 | 5/2006 | Nakamura et al. | |
| 2006/0019134 A1 * | 1/2006 | Yagi et al. | 429/17 |

FOREIGN PATENT DOCUMENTS

| | | |
|---|---|---|
| JP | 62-223975 | 10/1987 |
| KR | 2001-30251 | 4/2001 |

OTHER PUBLICATIONS

Office Action issued in Korean Application No. 2006-81841 on Jun. 19, 2007.

* cited by examiner

*Primary Examiner* — Jennifer Michener
*Assistant Examiner* — Monique Wills
(74) *Attorney, Agent, or Firm* — Lee & Morse, P.C.

(57) ABSTRACT

A passive cooling system for a fuel cell stack is provided. The passive cooling system includes a plurality of cooling plates, each installed between every few unit cells, each having flow channels for flowing a primary coolant on at least one surface, and each comprising an inlet hole through which the primary coolant enters and an outlet hole through which the primary coolant that has passed the flow channels leaves; and a heat exchanger installed on a primary coolant flow line connected from the outlet holes to the inlet holes of the cooling plates to change a vapor state primary coolant to a liquid state primary coolant by cooling the primary coolant, wherein a path through which the primary coolant passes is a closed circuit, and the flow of the primary coolant is achieved by natural convection caused by vaporization of the primary coolant.

20 Claims, 5 Drawing Sheets

PASSIVE COOLING SYSTEM FOR FUEL CELL STACK

CROSS-REFERENCE TO RELATED APPLICATIONS

This application claims the benefit of Korean Application No. 2006-81841, filed Aug. 28, 2006, in the Korean Intellectual Property Office, the disclosure of which is incorporated herein by reference.

BACKGROUND OF THE INVENTION

1. Field of the Invention

Aspects of the present invention relate to a passive cooling system for a fuel cell stack, and more particularly, to a passive cooling system for a fuel cell stack in which a primary coolant that circulates in cooling plates is circulated without pumping.

2. Description of the Related Art

A fuel cell is an electrical generation system that transforms chemical energy directly into electrical energy through a chemical reaction between oxygen introduced to the system and hydrogen contained in a hydrocarbon group material such as methanol, ethanol, or natural gas.

A polymer electrolyte membrane fuel cell (PEMFC) has advantages of superior output, low operating temperature, rapid starting, and a short response time compared to other fuel cells, and currently is the preferred fuel cell for automotive, portable, residential and small commercial applications.

Conventional PEMFCs are mainly operated at low temperatures, that is, below 100° C., e.g., about 80° C., because of a drying problem in a polymer electrolyte membrane. Because of their low operating temperatures, conventional PEMFCs also have the following problems. That is, a hydrogen-rich gas, which is a representative fuel for the PEMFCs, is obtained by reforming an organic fuel such as natural gas or methanol. However, the hydrogen-rich gas includes not only carbon dioxide, but also carbon monoxide as byproducts from the reforming process. The carbon monoxide may poison catalysts contained in a cathode and an anode. When the catalysts are poisoned, the electrochemical activity of the catalysts is greatly reduced, and accordingly the operating efficiency and lifetime of the PEMFCs are seriously reduced. The lower the operating temperature of the PEMFCs, the more severe is catalyst poisoning by carbon.

When the operating temperature of the PEMFCs increases to over 130° C., the fuel reformer can be miniaturized and a cooling apparatus can be simplified since catalyst poisoning by carbon monoxide can be avoided and the operating temperature of the PEMFCs can be readily controlled, thereby miniaturizing the overall PEMFC system.

A fuel cell system in which the fuel cell is cooled using cooling water having a temperature of approximately 70 to 80° C. has been disclosed in U.S. Pat. No. 7,052,790. This fuel cell system includes a cooling water pump that supplies cooling water from a cooling water tank to a fuel cell stack.

However, a fuel cell system cannot be reduced in size because of the volume of the cooling system when the fuel cell stack has a cooling water pump.

SUMMARY OF THE INVENTION

Aspects of the present invention provide a passive cooling system for a fuel cell stack that can circulate coolant, for example water, without use of a circulating pump.

One aspect of the present invention provides a passive cooling system for a fuel cell stack comprising: a plurality of cooling plates, each installed between every few unit cells, each having flow channels for flowing a primary coolant on at least one surface, and each comprising an inlet hole through which the primary coolant enters and an outlet hole through which the primary coolant that has passed the flow channels leaves; and a heat exchanger installed on a primary coolant flow line where the heat exchanger is connected from the outlet holes to the inlet holes of the cooling plates to change a vapor state primary coolant to a liquid state primary coolant by cooling the primary coolant, wherein the path through which the primary coolant passes is a closed circuit, and the flow of the primary coolant is achieved by natural convection caused by vaporizing of a portion of the primary coolant.

The inlet holes may be formed on lower parts of the cooling plates, and the outlet holes formed on upper parts of the cooling plates.

According to an aspect of the present invention, the heat exchanger may comprise a housing having a first hole through which the primary coolant that has passed the outlet hole enters, a second hole through which the primary coolant that was cooled exits, and a cooling pipe passing through the housing, through which housing a secondary coolant that cools the primary coolant inside the heat exchanger passes.

The cooling pipe inside the heat exchanger may be formed in a coil shape.

According to another aspect of the present invention, the heat exchanger may comprise a housing that surrounds the primary coolant flow line and is filled with a secondary coolant, and the primary coolant flow fine passes through the housing.

According to an aspect of the present invention, the housing may comprise a first hole through which the secondary coolant that cools the primary coolant flow line enters and a second hole through which the secondary coolant exits the housing.

The primary coolant may be at least one fluid selected from the group consisting of water, ethanol, acetic acid, and toluene.

The passive cooling system may further comprise a vapor-liquid separator installed between the outlet holes and the heat exchanger to separate a liquid state primary coolant and a vapor state primary coolant from a primary coolant in a liquid-vapor mixture state, wherein the vapor state primary coolant is sent to the heat exchanger from the vapor-liquid separator.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
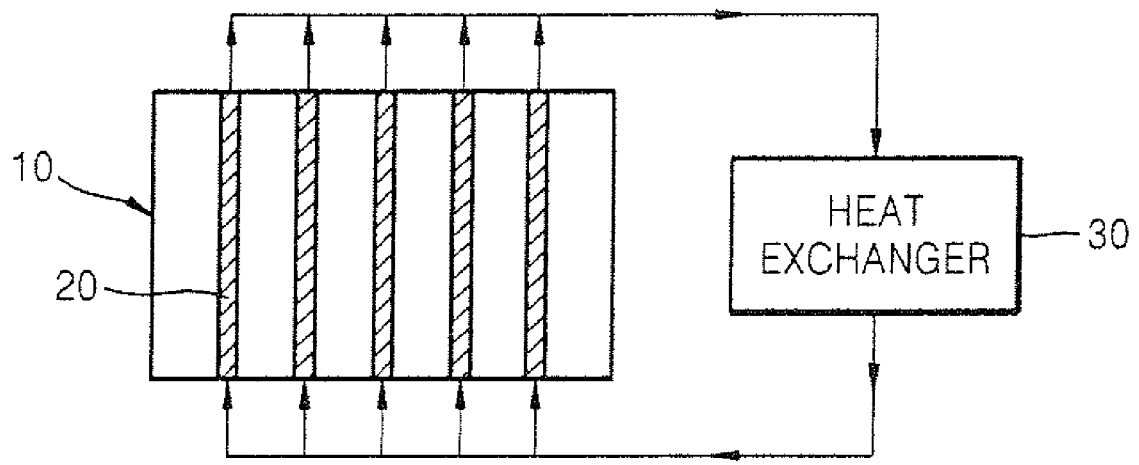
FIG. 1 is a conceptual drawing of a passive cooling system for a fuel cell stack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A passive cooling system for a fuel cell stack according to aspects of the present invention will now be described in detail with reference to accompanied drawings. In the drawings, the thicknesses of layers and regions are exaggerated for clarity.

FIG. 1 is a conceptual drawing of a passive cooling system for a fuel cell stack according to an embodiment of the present invention.

Referring to FIG. 1, a high temperature fuel cell stack 10, for example, a PEMFC stack, includes a plurality of cooling plates 20 to cool the fuel cell stack 10. Each of the cooling plates 20 includes flow channels (not shown). A primary coolant that passes through the flow channels absorbs heat from the fuel cell stack 10 and releases a portion of the heat in a heat exchanger 30, and afterwards, is re-circulated to the fuel cell stack 10. The primary coolant that circulates maintains a temperature of approximately operating temperature.

The primary coolant circulates in a closed circuit between the cooling plates 20 and the heat exchanger 30. The primary coolant enters the cooling plates 20 in a liquid state, and a portion of the primary coolant turns into a vapor state and the other portion remains as a liquid state. That is, the primary coolant absorbs heat by vaporizing in the fuel cell stack 10. The primary coolant that has passed through the fuel cell stack 10 releases heat in the heat exchanger 30 by changing into a liquid state from a vapor state while passing through the heat exchanger 30.

The primary coolant moves by natural convention which is caused by the density difference of the primary coolant between the higher density in lower parts and the lower density in upper parts of the cooling plates 20. That is, the primary coolant circulates between the fuel cell stack 10 and the heat exchanger 30 by natural convention without a pump.

In the present embodiment, the temperature of the fuel cell stack 10 is maintained within a predetermined range by circulating the primary coolant, for example, cooling water by natural convection.

The primary coolant may have a high heat of vaporization and a high boiling point, and can be at least one compound selected from the group consisting of water, ethanol, acetic acid, and toluene.

The structures of the cooling plates 20 and the heat exchanger 30 will now be described.

Figure 2:
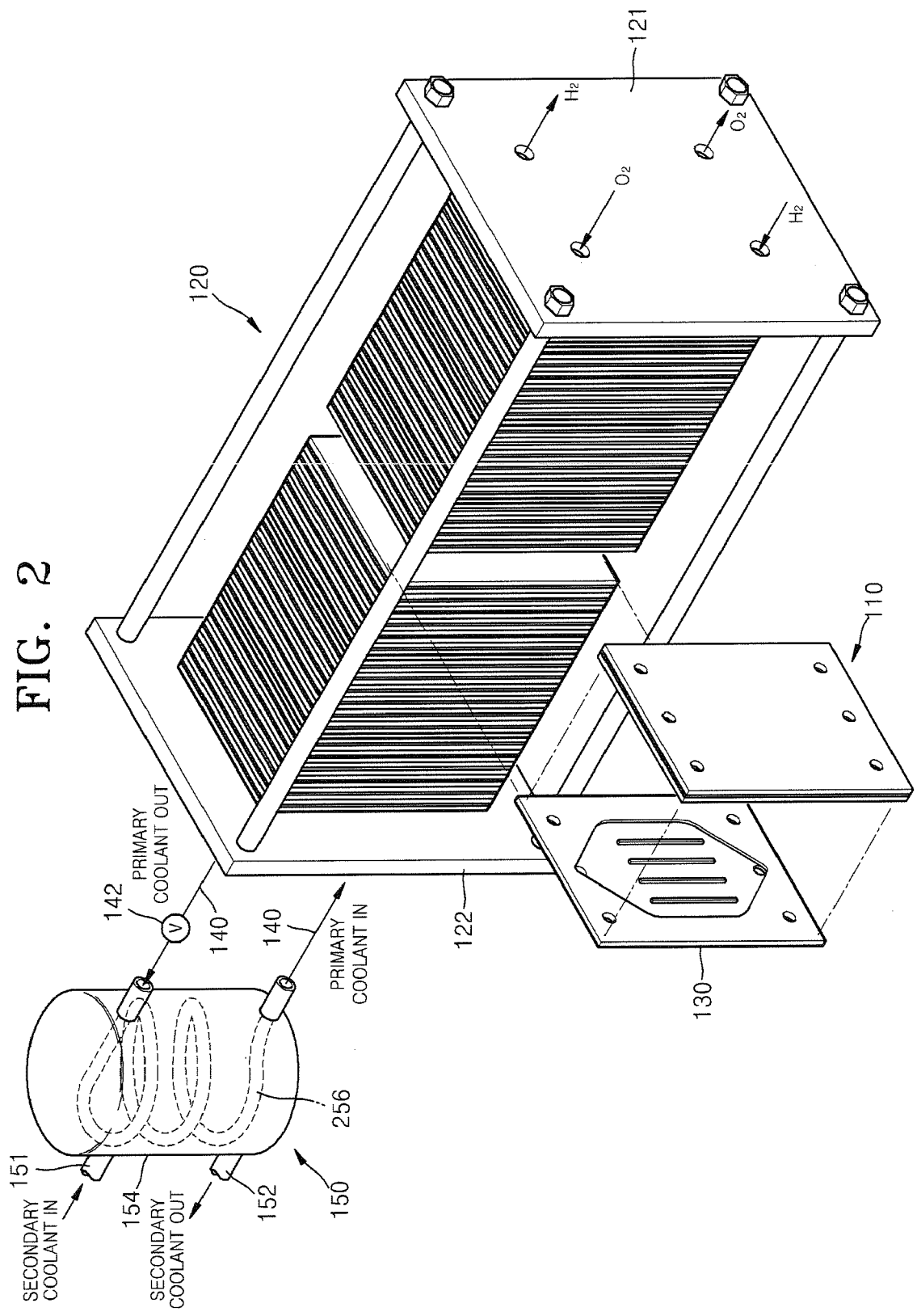
FIG. 2 is a perspective view illustrating a passive cooling system for a fuel cell stack, including the fuel cell stack, an exploded view of a unit cell and cooling plate, and a heat exchanger, according to an embodiment of the present invention.
Figure 3:
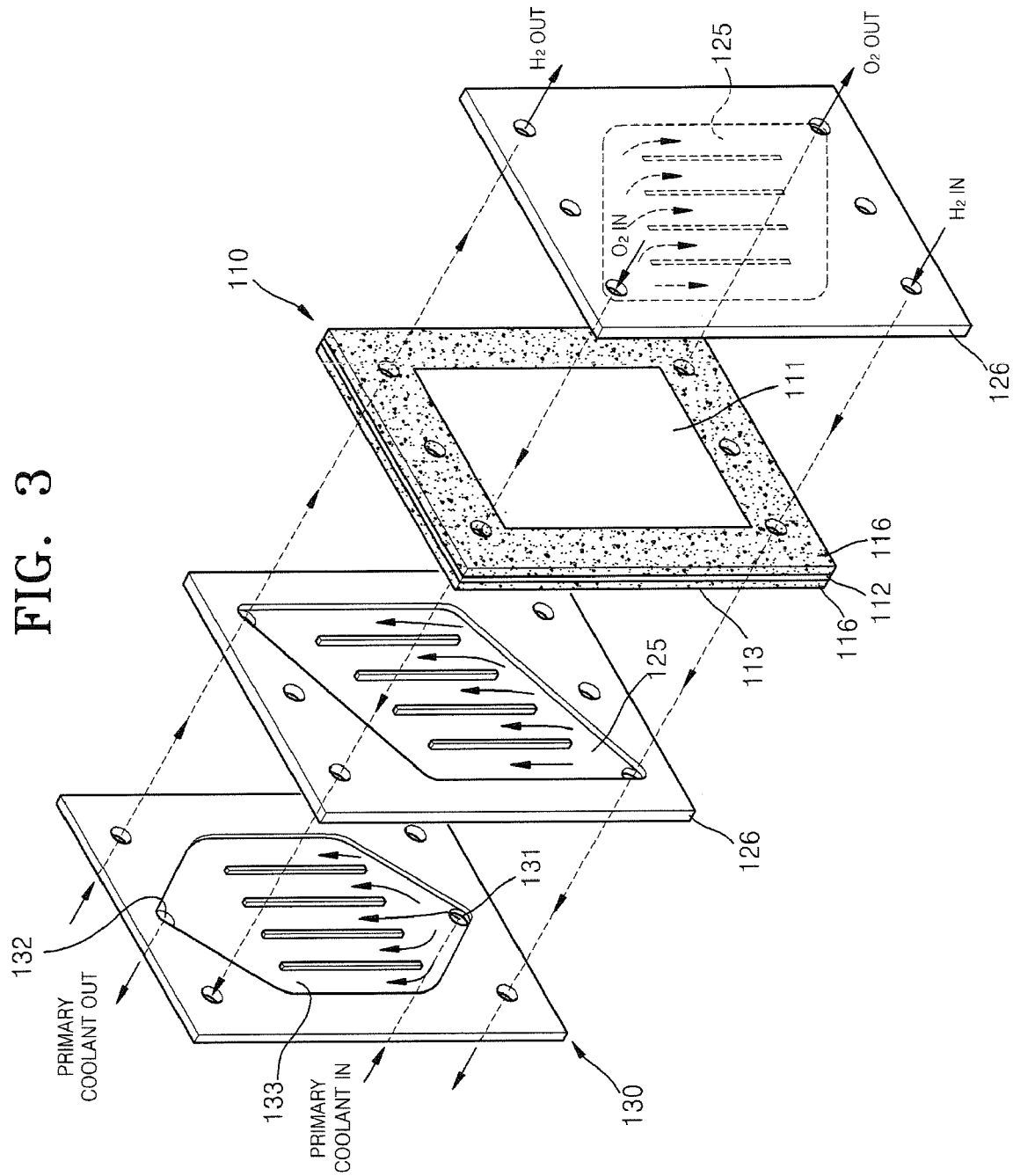
FIG. 3 is an exploded perspective view illustrating the flow of a fluid between the cooling plate and the unit cell of FIG. 2.

FIG. 2 is a perspective view illustrating a passive cooling system for a fuel cell stack, including the fuel cell stack, an exploded view of a unit cell and cooling plate, and a heat exchanger, according to an embodiment of the present invention, and FIG. 3 is an exploded perspective view illustrating the flow of a fluid between the cooling plate and the unit cell of FIG. 2;

Referring to FIGS. 2 and 3, a plurality of unit cells 110 are stacked in a polymer electrolyte membrane fuel cell (PEMFC) stack 120. Each unit cell 110 includes an electrolyte membrane 112, a cathode electrode 111 and an anode electrode 113 disposed on each side, respectively, of the electrolyte membrane 112. A separator 126 on which flow channels for supplying an oxidant and a hydrogen gas to each of the cathode electrode 111 and the anode electrode 113 are formed is located between the unit cells 110. A gasket 116 for sealing the unit cell 110 is installed between the electrodes 111 and 113 and the separators 126.

Since not only electricity but also heat is generated in an electrochemical reaction process of a fuel cell, a cooling process is needed in order to ensure smooth operation of the fuel cell. Cooling plates 130 and a heat exchanger 150 are installed to cool the fuel cell. In the PEMFC stack 120, each cooling plate 130 for passing primary coolant for exchanging heat may be disposed between every few unit cells 110.

An inlet hole 131 through which the primary coolant enters, an outlet hole 132 through which the primary coolant leaves, and flow channels 133 formed between the inlet hole 131 and the outlet hole 132 are formed on at least one surface of the cooling plate 130. The primary coolant that enters through the inlet hole 131 is mostly in a liquid state, and a portion of the primary coolant turns into a vapor state by absorbing heat from the unit cell 110 while passing through the flow channels 133, and the primary coolant in the vapor state leaves through the outlet hole 132. As depicted in FIG. 2, the cooling plate 130 and the unit cells 110 are vertically installed during operation, and the inlet hole 131 is located at a lower part of the cooling plate 130 and the outlet hole 132 is located at an upper part of the cooling plate 130.

End plates 121 and 122 are respectively formed on both ends of the PEMFC stack 120. In the end plate 121, a supply hole and a recovery hole for air (or oxygen) and a supply hole and a recovery hole for a fuel (hydrogen gas) are formed, and in the end plate 122, a supply hole 123 (refer to FIG. 5) and a recovery hole 124 (refer to FIG. 5) for the primary coolant are formed. The holes for receiving and discharging air (oxygen), fuel (hydrogen gas) or primary coolant are respectively formed on the cooling plate 130, the unit cells 110, and the separator 126.

The heat exchanger 150 includes a housing 154 that surrounds a primary coolant flow line 140 between the recovery hole 124 of the end plate 122 and the supply hole 123 of the end plate 122. The primary coolant flow line 140 passes through the housing 154, and may be formed in a coil shape in the housing 154 to increase the contact surface with a secondary coolant which will be described later, for example, secondary coolant.

The housing 154 can include a first hole 151 through which the secondary coolant enters and a second hole 152 through which the secondary coolant exits from the housing 154. The secondary coolant that cools the primary coolant flow line 140 enters through the first hole 151.

The primary coolant absorbs heat from the PEMFC stack 120 while passing through the flow channel 133 of the cooling plate 130 and transfers the heat to the secondary coolant in the heat exchanger 150, and afterwards, re-circulates to the PEMFC stack 120. Air can be used instead of cooling water as the secondary coolant.

The primary coolant, for example, cooling water that circulates between the cooling plate 130 and the heat exchanger 150, exists in a mixed state of primary coolant in a liquid state and primary coolant in a vapor state. When the operating temperature of the PEMFC stack 120 is maintained at approximately 150° C., the temperature of the primary coolant (a mixture of vapor and liquid) is slightly lower than the operating temperature, and at this time, the pressure of the PEMFC stack 120 is maintained at approximately 5 atmospheres.

Reference numeral 142 indicates an electronic valve. The first electronic valve 142 is closed to reduce heat discharge from the PEMFC stack 120 and to increase temperature of the PEMFC stack 120 when the PEMFC stack 120 temperature is low, for example, below the 150° C. initial operating temperature.

Figure 4:
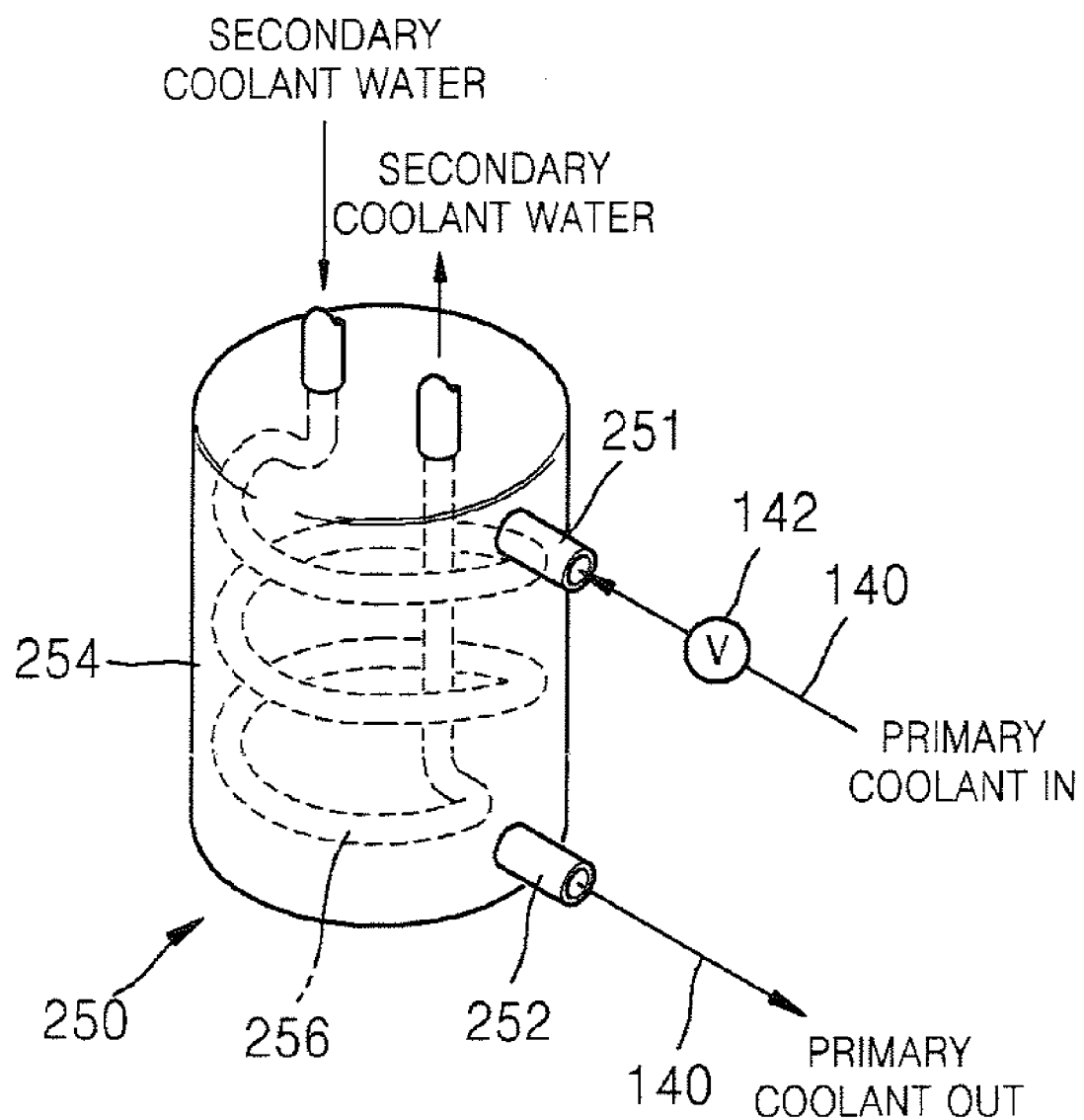
FIG. 4 is a perspective view illustrating a modified example of a heat exchanger according to another embodiment of the present invention.

FIG. 4 is a perspective view illustrating a modified example of a heat exchanger. Like reference numerals denote like elements in FIG. 2 and thus descriptions thereof will not be repeated.

Referring to FIG. 4, a primary coolant flow line 140 is connected to a first hole 251 and a second hole 252 formed on a housing 254. A heat exchanger 250 includes a coil shape cooling pipe 256 that passes through the housing 254. A secondary coolant, for example, secondary cooling water passes through the coil shape cooling pipe 256. The secondary coolant changes vapor state water from the primary coolant that is inside the housing 254 into a liquid state.

When the amount of the primary coolant is reduced due to leakage to the outside, the primary coolant can be readily supplemented through a hole (not shown) on the housing 254.

Figure 5:
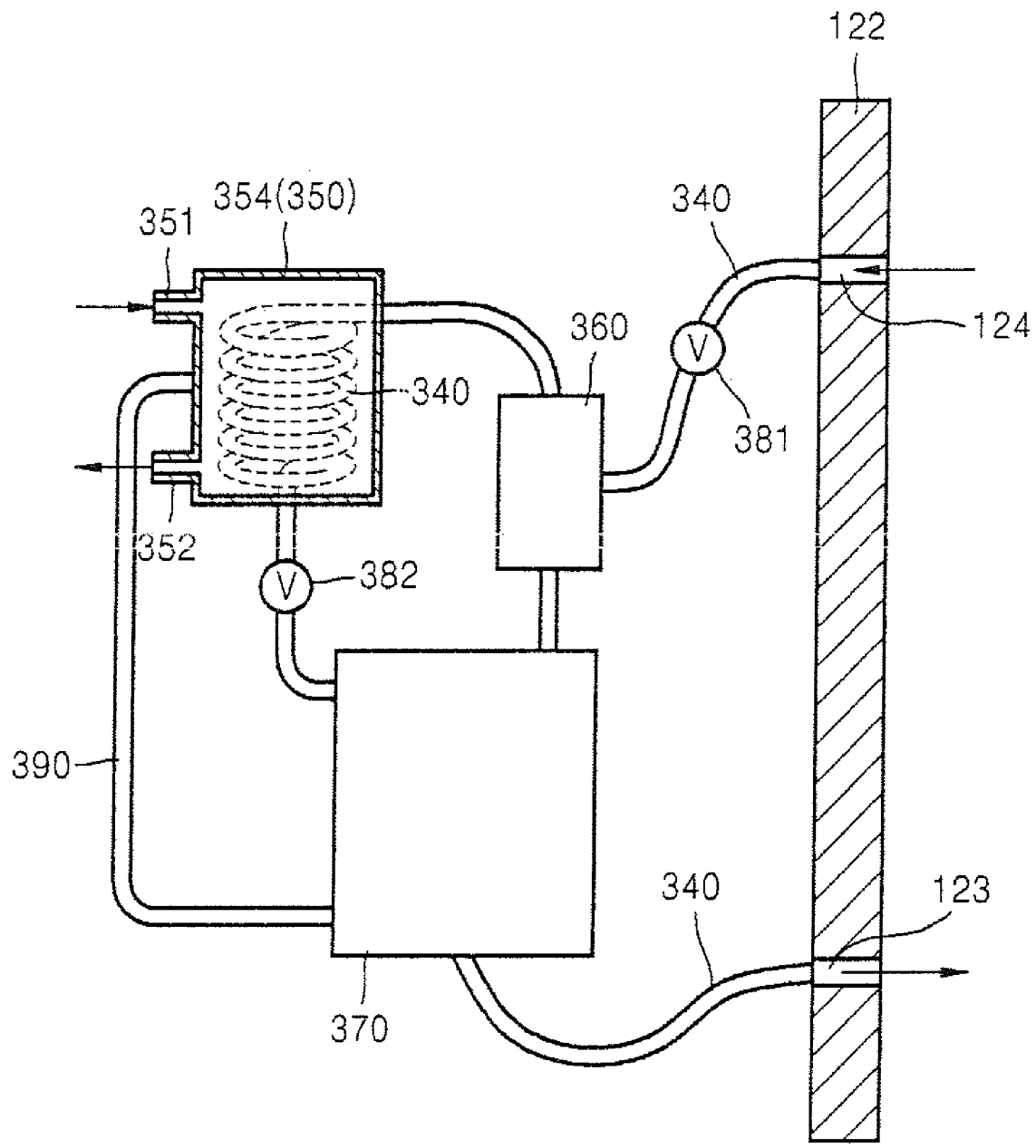
FIG. 5 is a schematic drawing illustrating a cooling system according to another embodiment of the present invention.

FIG. 5 is a schematic drawing illustrating a cooling system according to another embodiment of the present invention. Like reference numerals denote like elements from previous drawings and thus descriptions thereof will not be repeated.

Referring to FIG. 5, a vapor-liquid separator 360, a heat exchanger 350, and a liquid storage 370 are installed on a primary coolant flow line 340 between a recovery hole 124 and a supply hole 123 of an end plate 122. Primary coolant that exits through the recovery hole 124 of the end plate 122 that is partially in a gaseous state and partially in a liquid state is separated while passing through the vapor-liquid separator 360. The liquid state of the primary coolant (hereinafter the liquid) enters the liquid storage 370 by gravitational force and the vapor state primary coolant (hereinafter the vapor) passes through housing 354 into the heat exchanger 350.

Formed on housing 354 are a first hole 351 through which a secondary coolant, for example, secondary cooling water enters housing 354 and a second hole 352 through which the secondary coolant exits housing 354, wherein the secondary coolant has increased in temperature by cooling a primary coolant flow line 340 in the housing 354. The primary coolant flow line 340 in the housing 354 may be formed in a coil shape inside the housing 354 to increase contact surface with the secondary coolant. Although it depends on the efficiency of the heat exchanger 350, most of the primary coolant that passes through the heat exchanger 350 can be converted into a liquid state from a vapor state by increasing the flow rate of the secondary coolant.

The primary coolant that has passed through the heat exchanger 350 enters the liquid storage 370 mostly in a liquid state.

The primary coolant in a liquid state enters the PEMFC stack 120 from the liquid storage 370 since the primary coolant flow line 340 connected to the supply hole 123 of the end plate 122 is installed in a lower part of the liquid storage 370.

A gauge 390 for measuring the amount of the primary coolant is installed between the heat exchanger 350 and the liquid storage 370. The gauge 390 can be a transparent heat resistance pipe, and leaks of the primary coolant can be checked through the gauge 390. When it is determined through the gauge 390 that the quantity of the primary coolant is not sufficient, the primary coolant can be supplemented through the liquid storage 370 or the heat exchanger 350.

A first electronic valve 381 can be installed in the primary coolant flow line 340 that connects the recovery hole 124 of the end plate 122 to the vapor-liquid separator 360. The first electronic valve 381 is used for increasing the initial temperature of the PEMFC stack 120 by closing the first electronic valve 381 when the temperature of the PEMFC stack 120 is low, for example, below 150° C. during initial operation of the fuel cell.

A second electronic valve 382 can be installed in the primary coolant flow line 340 between the heat exchanger 350 and the liquid storage 370. The second electronic valve 382 can control the flow of cooled liquid that enters the liquid storage 370 from the heat exchanger 350. The second electronic valve 382 may control the liquid recovered from the heat exchanger 350 to enter the liquid storage 370 at a range of temperatures.

In the cooling system according to another embodiment, the heat exchanger 250 in FIG. 2 can be used instead of the heat exchanger 350 in FIG. 5, such that the description need not be repeated.

As described above, a cooling system according to embodiments of the present invention does not use a pump for circulating a primary coolant since the primary coolant is circulated by natural convection. Accordingly, the power required to operate the pump is eliminated, and the size of the fuel system can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A passive cooling system for a fuel cell stack comprising:
    a plurality of cooling plates, each installed amongst unit cells, each cooling plate having flow channels to flow a primary coolant on at least one surface, and each cooling plate comprising an inlet hole through which the primary coolant enters and an outlet hole through which the primary coolant that has passed through the flow channels leaves; and
    a heat exchanger installed on a primary coolant flow line connected from the outlet holes to the inlet holes of the cooling plates to change a vapor state primary coolant to a liquid state primary coolant by cooling the primary coolant;
    wherein a path through which the primary coolant passes is a closed circuit, and the flow of the primary coolant is achieved without a pump by natural convection caused by vaporization of the primary coolant.

2. The passive cooling system of claim 1, wherein the inlet holes are formed on lower parts of the cooling plates, and the outlet holes are formed on upper parts of the cooling plates.

3. The passive cooling system of claim 1, wherein the heat exchanger comprises:
    a housing having a first hole through which the primary coolant that has passed the outlet hole enters and a second hole through which the primary coolant that was cooled exits; and
    a cooling pipe passing through the housing, through which a secondary coolant that cools the primary coolant inside the heat exchanger passes.

4. The passive cooling system of claim 3, wherein the cooling pipe inside the heat exchanger has a coil shape.

5. The passive cooling system of claim 1, wherein the heat exchanger comprises a housing that surrounds the primary coolant flow line and is filled with a secondary coolant, and the primary coolant flow line passes through the housing.

6. The passive cooling system of claim 5, wherein the housing comprises a first hole through which the secondary coolant that cools the primary coolant flow line enters and a second hole through which the secondary coolant exits the housing.

7. The passive cooling system of claim 5, wherein the primary coolant flow line inside the housing has a coil shape.

8. The passive cooling system of claim 1, wherein the primary coolant is at least one fluid selected from the group consisting of water, ethanol, acetic acid, and toluene.

9. The passive cooling system of claim 1, further comprising a vapor-liquid separator installed between the outlet holes and the heat exchanger to separate the liquid-vapor mixture state of the primary coolant into a liquid state primary coolant and a vapor state primary coolant, wherein the vapor state primary coolant is sent to the heat exchanger from the vapor-liquid separator.

10. The passive cooling system of claim 9, wherein the heat exchanger changes the vapor state primary coolant into a liquid state primary coolant.

11. The passive cooling system of claim 9, wherein the heat exchanger comprises:
   a housing having a first hole through which the vapor state primary coolant that has been separated from the vapor-liquid separator enters and a second hole through which the liquid state primary coolant that has been cooled inside the heat exchanger exits; and
   a cooling pipe passing through the housing, through which a secondary coolant that cools the primary coolant in the heat exchanger passes.

12. The passive cooling system of claim 11, wherein the secondary coolant pipe inside the heat exchanger has a coil shape.

13. The passive cooling system of claim 9, wherein the heat exchanger comprises a housing that surrounds the primary coolant flow line for transporting the vapor state primary coolant separated from the vapor-liquid separator and the housing is filled with a secondary coolant, and the primary coolant flow line passes through the housing.

14. The passive cooling system of claim 13, wherein the housing comprises a first hole through which the secondary coolant that cools the primary coolant flow line enters and a second hole through which the secondary coolant exits the housing.

15. The passive cooling system of claim 14, wherein the primary coolant flow line inside the housing has a coil shape.

16. The passive cooling system of claim 9, further comprising a first electronic valve that is installed in the primary coolant flow line between the outlet holes of the fuel cell stack and the heat exchanger and selectively opens and closes the primary coolant flow line.

17. The passive cooling system of claim 9, further comprising a liquid storage tank installed on the primary coolant flow line between the vapor-liquid separator and the inlet holes to store the liquid state primary coolant separated from the vapor-liquid separator, wherein the liquid state primary coolant from the heat exchanger is input to the liquid storage.

18. The passive cooling system of claim 17, further comprising a gauge between the liquid storage and the heat exchanger to measure the amount of the primary coolant inside the liquid storage.

19. The passive cooling system of claim 9, wherein the primary coolant is at least one fluid selected from the group consisting of water, ethanol, acetic acid, and toluene.

20. The passive cooling system of claim 9, further comprising:
   a liquid storage tank for storing primary coolant exiting from the vapor-liquid separator and the heat exchanger; and
   a second electronic valve controlling the flow of primary coolant from the heat exchanger to the liquid storage tank.

* * * * *